United States Patent
Rehfus et al.

(10) Patent No.: US 9,605,723 B2
(45) Date of Patent: Mar. 28, 2017

(54) AIRCRAFT BRAKE ACTUATOR ASSEMBLIES

(71) Applicant: Goodrich Corporation, Charlotte, NC (US)

(72) Inventors: Kevin Rehfus, Troy, OH (US); David Drennen, Bellbrook, OH (US); Harald Klode, Centerville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 23 days.

(21) Appl. No.: 14/805,263

(22) Filed: Jul. 21, 2015

(65) Prior Publication Data

US 2017/0023078 A1   Jan. 26, 2017

(51) Int. Cl.
| | |
|---|---|
| *F16D 65/18* | (2006.01) |
| *B64C 25/44* | (2006.01) |
| *F16D 125/40* | (2012.01) |
| *F16D 121/24* | (2012.01) |

(52) U.S. Cl.
CPC ............. *F16D 65/18* (2013.01); *B64C 25/44* (2013.01); *F16D 2121/24* (2013.01); *F16D 2125/40* (2013.01)

(58) Field of Classification Search
CPC ............. F16H 25/2204; F16H 25/2214; F16D 2125/40; F16D 2121/41; F16D 65/16; F16D 65/18; B64C 25/44

USPC .................. 188/156; 74/434, 424.84, 424.82
See application file for complete search history.

(56) References Cited

U.S. PATENT DOCUMENTS

| | | | |
|---|---|---|---|
| 5,467,662 A | 11/1995 | Lange et al. | |
| 8,950,282 B2 | 2/2015 | Babinski | |
| 2005/0247529 A1* | 11/2005 | Gaines | F16D 65/18 188/72.8 |
| 2015/0050149 A1 | 2/2015 | Perkinson | |

FOREIGN PATENT DOCUMENTS

| | | |
|---|---|---|
| EP | 1326033 | 3/2008 |
| JP | 61153051 | 7/1986 |

* cited by examiner

*Primary Examiner* — Melanie Torres Williams
(74) *Attorney, Agent, or Firm* — Snell & Wilmer L.L.P.

(57) ABSTRACT

The present disclosure provides an actuator assembly comprising a ballnut having a helical track, an actuator drive unit ("ADU") housing having an ADU track, and a ballscrew. In various embodiments, the ballscrew comprises a first translation bearing track, wherein the helical track and the first translation bearing track form a first translation bearing raceway in which a plurality of first translation bearing balls having a first diameter are disposed, and a second translation bearing track, wherein the helical track and the second translation bearing track form a second translation bearing raceway in which a plurality of second translation bearing balls having a second diameter are disposed, wherein the first diameter and the second diameter are not equal.

17 Claims, 8 Drawing Sheets

FIG. 6b ns AIRCRAFT BRAKE ACTUATOR
ASSEMBLIES

FIELD OF THE DISCLOSURE

The present disclosure relates to actuator assemblies, and more particularly, to aircraft brake actuator ballscrew assemblies.

BACKGROUND OF THE DISCLOSURE

Electric aircraft brakes often include a ballscrew for linear translation. A ballscrew typically converts rotational motion into translational motion by rotating the ballscrew, which translates a ballnut. Conventional actuator assemblies may comprise a ballscrew and a stationary motor housing, wherein one or more rolling element bearings (e.g., balls or rollers) are in contact with the ballscrew and motor housing. A conventional actuator assembly may also comprise a ballnut configured to engage the ballscrew, such that rotational motion of the ballscrew causes translation of the ballnut. In an electric aircraft brake, the ballnut may (either directly or through other components) apply force to a brake stack to create frictional resistance to rotary movement of the wheel to stop the aircraft.

Aircraft brake actuators may be subject to weight limitations and high load capacities. Under ideal weight and load conditions, components of aircraft brake actuators may be prone to increased deflection. Excessive deflection may cause damage to aircraft brake actuator components, decreasing the cycle life of such components.

SUMMARY OF THE DISCLOSURE

In various embodiments, the present disclosure provides an actuator assembly comprising a ballnut having a helical track, and a ballscrew. In various embodiments, the actuator assembly comprises a first translation bearing raceway in which a plurality of first translation bearing balls having a first diameter are disposed, and a second translation bearing raceway in which a plurality of second translation bearing balls having a second diameter are disposed, wherein the first diameter and the second diameter are not equal. In various embodiments, the actuator assembly further comprises a third translation bearing raceway in which a plurality of third translation bearing balls having a third diameter is disposed. In various embodiments, the first diameter is smaller than the second diameter and/or the third diameter.

In various embodiments, the translation bearing track comprises a cross-under track. In various embodiments, the first translation bearing track is proximal to the second translation bearing track and/or the third translation bearing track. In various embodiments, the first translation bearing track is distal to the second translation bearing track and/or the third translation bearing track. In various embodiments, the first translation bearing track is medial to the second translation bearing track and/or the third translation bearing track. In various embodiments, the first diameter is about 10.16 micrometers (0.0004 inches) smaller than at least one of the second diameter or the third diameter.

In various embodiments, the present disclosure provides an actuator assembly comprising an actuator drive unit ("ADU") housing having an ADU track, and a ballscrew. In various embodiments, the actuator assembly comprises a first thrust bearing raceway in which a plurality of first thrust bearing balls having a fourth diameter are disposed, and a second thrust bearing raceway in which a plurality of second thrust bearing balls having a fifth diameter are disposed, wherein the fourth diameter and the fifth diameter are not equal. In various embodiments, the actuator assembly further comprises a third thrust bearing raceway in which a plurality of third thrust bearing balls having a sixth diameter is disposed. In various embodiments, the fourth diameter is smaller than the fifth diameter and/or the sixth diameter.

In various embodiments, the first thrust bearing track is proximal to the second thrust bearing track and/or the third thrust bearing track. In various embodiments, the first thrust bearing track is distal to the second thrust bearing track and/or the third thrust bearing track. In various embodiments, the first thrust bearing track is medial to the second thrust bearing track and/or the third thrust bearing track. In various embodiments, the fourth diameter is about 10.16 micrometers (0.0004 inches) smaller than at least one of the fifth diameter or the sixth diameter.

In various embodiments, the present disclosure provides an aircraft brake actuator comprising an actuator assembly having a variable ball-size configuration.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft brake actuator ballscrew assemblies. However, various aspects of the disclosed embodiments may be adapted for optimized performance with a variety of brake actuators and/or actuator assemblies. As such, numerous applications of the present disclosure may be realized.

In various embodiments, an aircraft brake actuator may comprise an actuator assembly comprising a ballscrew, a ballnut, and an actuator drive unit ("ADU") housing. In various embodiments, the actuator assembly may further comprise a translation bearing raceway and/or one or more thrust bearing raceways. In various embodiments, the translation bearing raceway may comprise an annular track between the ballnut and the ballscrew having a plurality of translation bearing balls disposed therein. In various embodiments, a thrust bearing raceway may comprise an annular track between the ballscrew and the ADU housing having a plurality of thrust bearing balls disposed therein. The ballscrew may rotate in order to drive the ballnut in an axial direction.

In various embodiments, a puck coupled to the ballnut may contact a brake stack. In various embodiments, the contact with the brake stack may exert an axial load through the ballnut and the ballscrew to the ADU housing via the translation bearing balls and the thrust bearing balls. In various embodiments, contact with the brake stack may cause deflection of the ballnut and/or the ballscrew. In various embodiments, one or more rows of translation bearing balls in the translation bearing raceway and thrust bearing balls in the thrust bearing raceways may increase a load capacity of the aircraft brake actuator.

In various embodiments, the actuator assembly may comprise a variable ball-size configuration, wherein each translation bearing ball and/or thrust bearing ball disposed in a first row has a first diameter and each translation bearing ball disposed in a second row has a second diameter different than the first diameter. Stated differently, the variable ball-size configuration may comprise balls having a uniform size within each row, and variable sizes between rows. In various embodiments, the variable ball-size configuration may be desirable for reasons including, without limitation, improved load sharing among actuator assembly components, improved actuator assembly life, reduced actuator assembly size and/or weight based on a reduced number of raceways and/or reduced size of translation bearing balls and/or thrust bearing balls, and the like.

Figure 1:
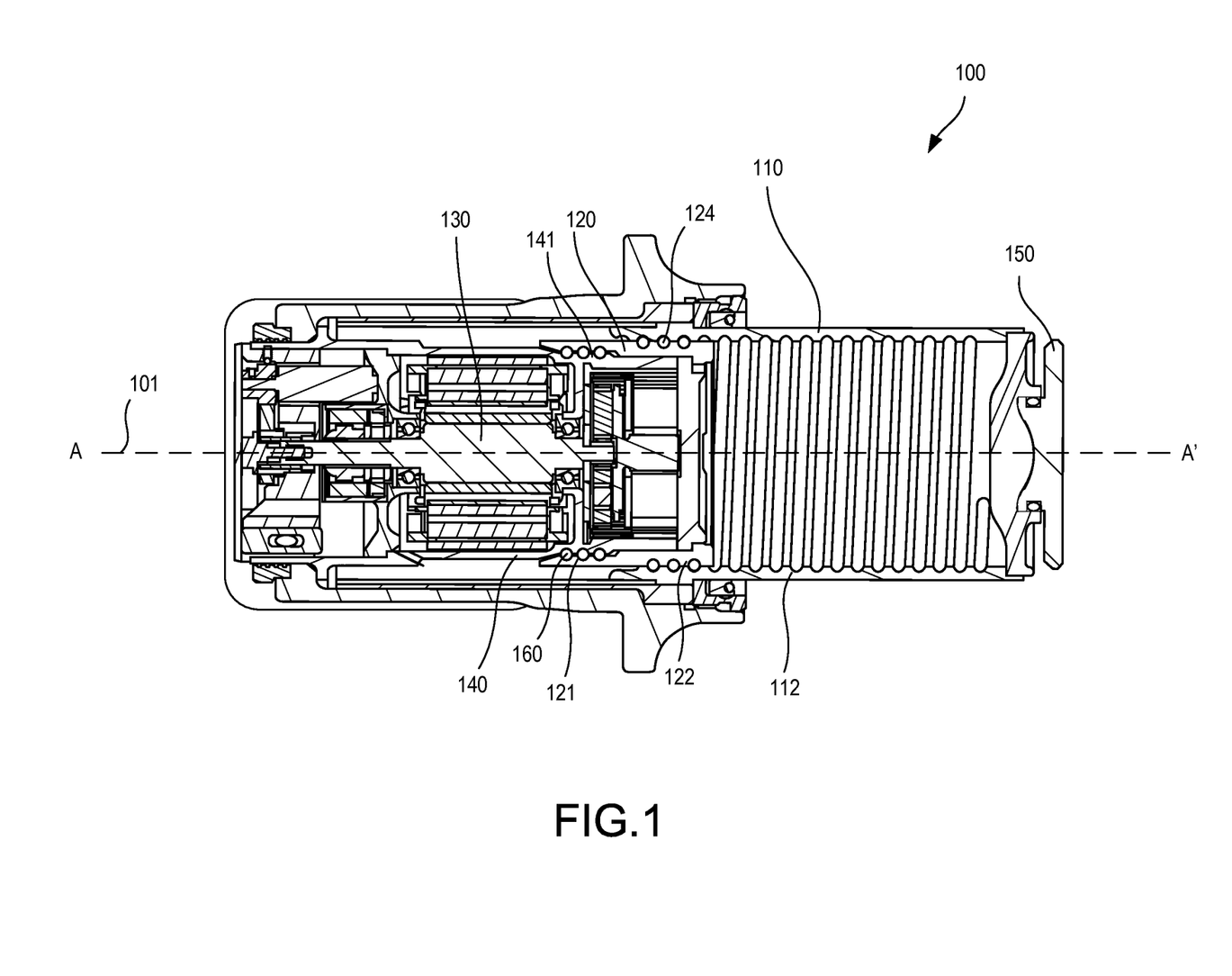
FIG. 1 illustrates a cross section view of a portion of an actuator assembly in accordance with various embodiments.

Referring to FIG. 1, in various embodiments an actuator 100 may extend along an axis 101 marked A-A', with A being located near a distal portion of actuator 100 and A' being near a proximal portion of actuator 100. In various embodiments, actuator 100 may, as described above, comprise an aircraft brake actuator and/or be involved in the application of a braking force to an aircraft wheel. In various embodiments, actuator 100 may comprise a variety of components, including, for example, a ballnut 110, a ballscrew 120, and an actuator drive unit ("ADU") 130. In various embodiments, the ADU 130 may be located within an ADU housing 140. Generally, the ADU 130 may rotate and may drive ballscrew 120 through a plurality of rotations.

In various embodiments, ballscrew 120 may comprise one or more translation bearing tracks 122. In various embodiments, translation bearing tracks 122 may comprise annular or substantially annular grooves and/or channels disposed in a radially outward surface of ballscrew 120. In various embodiments, ballnut 110 may comprise a helical track 112 disposed in a radially inward surface of ballnut 110. In various embodiments, ballnut 110 may be configured to at least partially surround ballscrew 120 such that one or more translation bearing tracks 122 and helical track 112 align to form a translation bearing raceway 451 (with momentary reference to FIG. 4).

Figure 4:
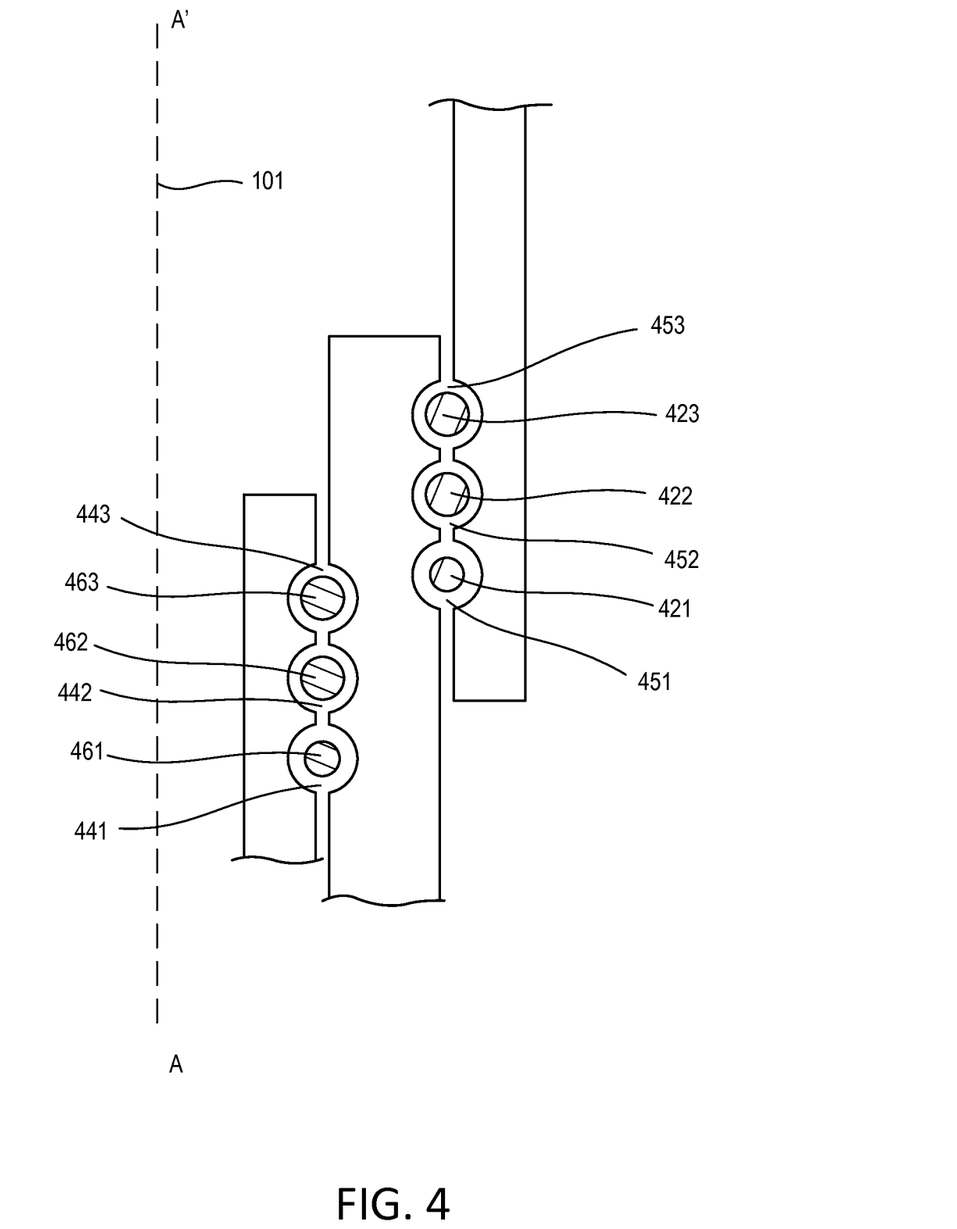
FIG. 4 illustrates a partial cross section view of an actuator assembly in accordance with various embodiments.

In various embodiments, a plurality of translation bearing balls 124 may be disposed within translation bearing raceway 451 (with momentary reference to FIG. 4). In various embodiments, the translation bearing balls 124 may be metal spheres which may decrease friction and transfer loads between adjacent components. However, translation bearing balls 124 may comprise any material and any shape suitable for use in an actuator assembly. In various embodiments, rolling element bearings that are not spherical in shape could be used in place of translation bearing balls 124. For example, cylindrical rollers could be used in place of translation bearing balls 124. In various embodiments, as ballscrew 120 rotates, ballnut 110 may translate distally and/or proximally along the axis 101 marked A-A' (depending upon the direction of rotation of ballscrew 120).

In various embodiments, ballscrew 120 may further comprise one or more thrust bearing tracks 121. In various embodiments, thrust bearing tracks 121 may comprise annular or substantially annular grooves and/or channels disposed in a radially inward surface of ballscrew 120. In various embodiments, ADU housing 140 may comprise one or more ADU tracks 141 disposed in a radially outward surface of ADU housing 140. In various embodiments, ballscrew 120 may be configured to at least partially surround ADU housing 140 such that one or more thrust bearing tracks 121 and one or more ADU tracks 141 align to form thrust bearing raceway 441 (with momentary reference to FIG. 4).

In various embodiments, a plurality of thrust bearing balls 160 may be disposed within thrust bearing raceway 441 (with momentary reference to FIG. 4) and may distribute the load applied on ADU housing 140 from ballscrew 120. In various embodiments, thrust bearing balls 160 may be metal spheres which tend to decrease friction and transfer loads between adjacent components. However, thrust bearing balls 160 may comprise any material and any shape suitable for use in an actuator assembly. In various embodiments, rolling element bearings that are spherical in shape and could be used in place of thrust bearing balls 160. In various embodiments, as ballscrew 120 rotates, ballnut 110 may translate distally and/or proximally along the axis 101 marked A-A' (depending upon the direction of rotation of ballscrew 120).

In various embodiments, ballnut 110 may be coupled to a disc or "puck," 150 at a distal end thereof. In various embodiments, puck 150 may exert a pressure against a brake stack coupled to an aircraft wheel to impede or halt rotation of the wheel. In various embodiments, the pressure may be transferred back through puck 150, to ballnut 110, to ballscrew 120, and to ADU housing 140.

Figure 2:
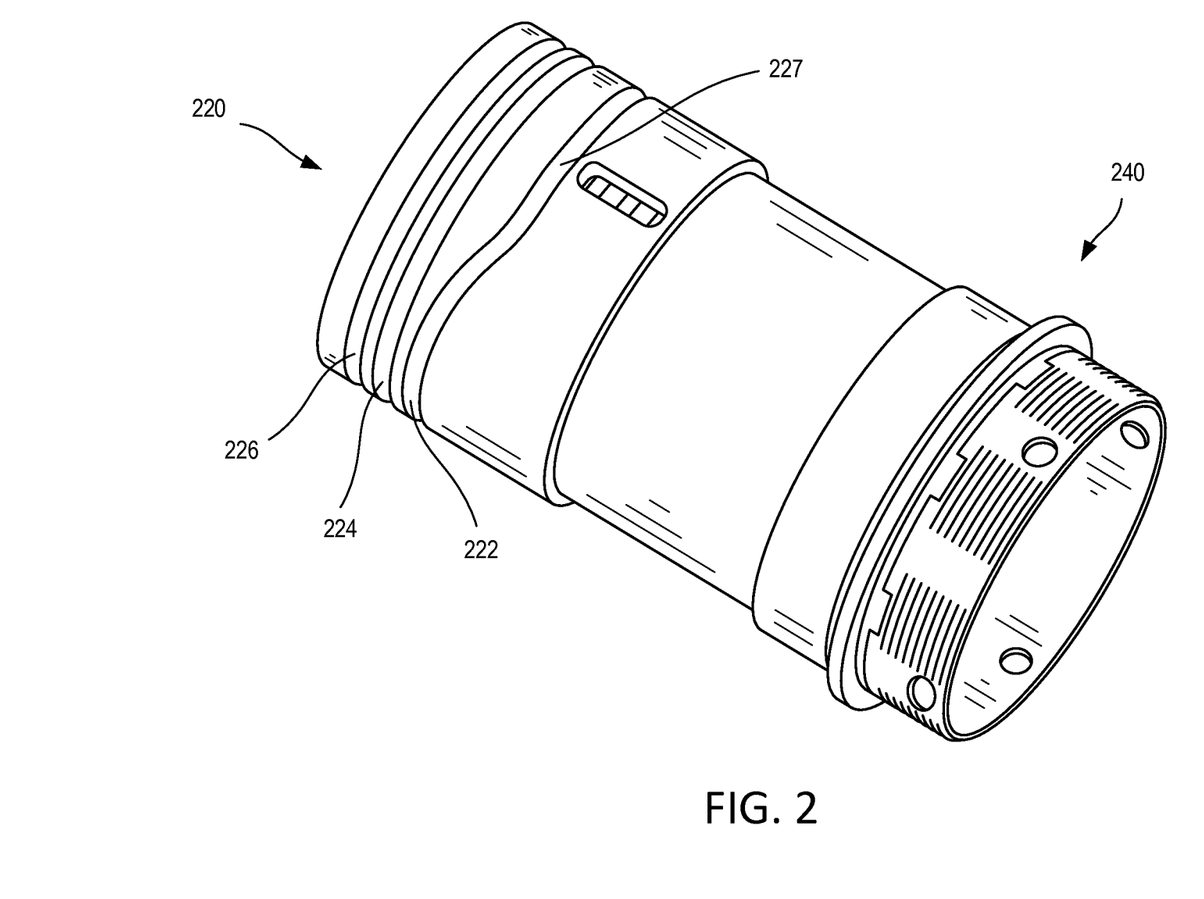
FIG. 2 illustrates a perspective view of a portion of an actuator assembly in accordance with various embodiments.

Referring to FIG. 2, a perspective view of a ballscrew 220 and an ADU housing 240 is illustrated according to various embodiments. In various embodiments, ballscrew 220 may comprise a first translation bearing track 222 and a second translation bearing track 224. In various embodiments, ballscrew 220 may further comprise a third translation bearing track 226.

In various embodiments, at least one of first translation bearing track 222, second translation bearing track 224, or third translation bearing track 226 may comprise a cross-under track. In various embodiments, a cross-under track may be independent (i.e. balls in cross-under first translation bearing track 222 do not enter second translation bearing track 224 and/or third translation bearing track 226). In various embodiments, the cross-under track may comprise a cross-under portion 227. In FIG. 2, cross-under portion 227 is shown for first translation bearing track 222. In various embodiments, at cross-under portion 227, a radial depth of first translation bearing track 222 may be greater than the remaining portion of first translation bearing track 222, allowing translation bearing balls to move under the threads of a ballnut.

Figure 3:
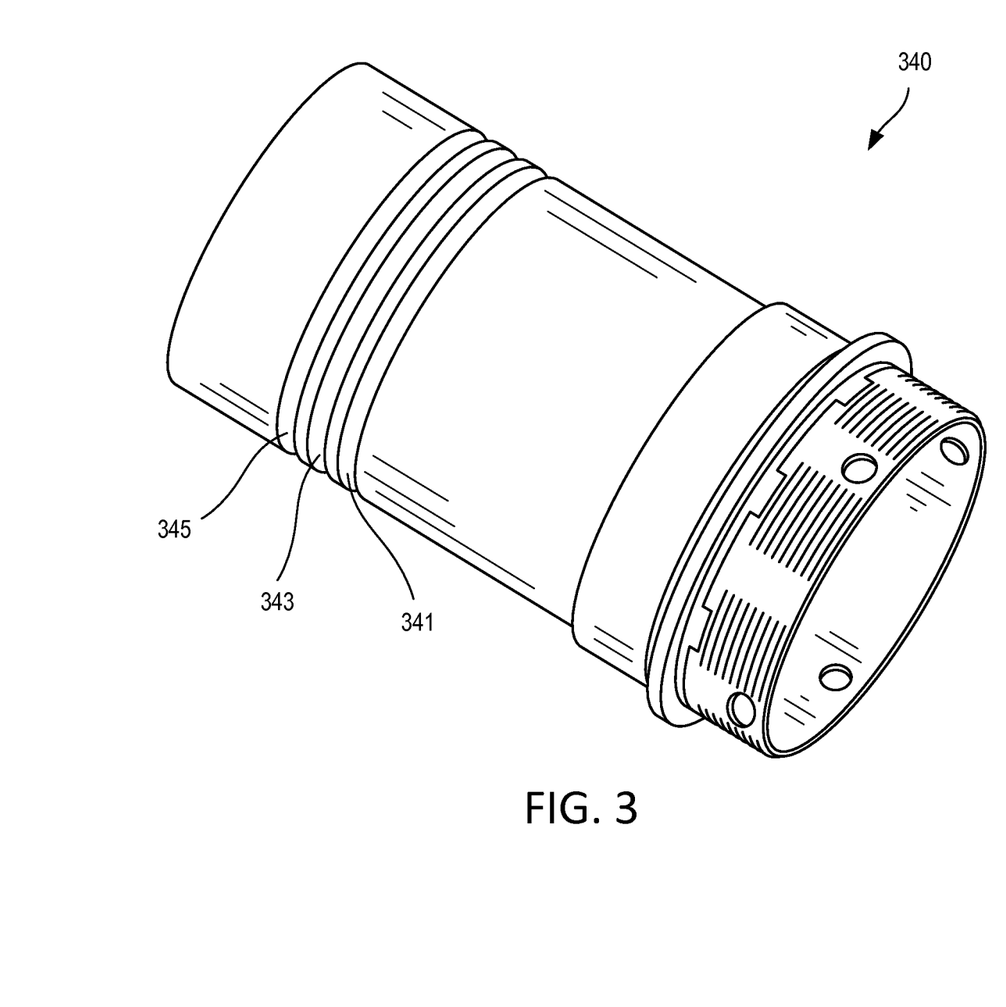
FIG. 3 illustrates perspective view of a ballscrew in accordance with various embodiments.

Referring to FIG. 3, a perspective view of an ADU housing 340 is illustrated according to various embodiments. In various embodiments, ADU housing 340 may comprise a first ADU track 341 and a second ADU track 343. In various embodiments, ADU housing 340 may further comprise a third ADU track 345.

Referring to FIG. 4, in various embodiments, a plurality of first translation bearing balls 421 comprising a first diameter may be disposed in a first translation bearing raceway 451. In various embodiments, a plurality of second translation bearing balls 422 comprising a second diameter may be disposed in a second translation bearing raceway 452. In various embodiments, first diameter may be smaller than second diameter. In various embodiments, first diameter may be about 10.16 micrometers smaller than second diameter, wherein the term about means+/−2.54 micrometers (0.0001 inches). In various embodiments, first diameter may be about 3.1801 millimeters (0.1252 inches) to about 3.1598 millimeters (0.1244 inches), and second diameter may be about 3.1902 millimeters (0.1256 inches) to about 3.1699 millimeters (0.1248 inches), wherein the term about means+/−2.54 micrometers (0.0001 inches). In various embodiments, first diameter may be about 3.175 millimeters (0.1250 inches) to about 3.165 millimeters (0.1246 inches), and second diameter may be about 3.185 millimeters (0.1254 inches) to about 3.175 millimeters (0.1250 inches), wherein the term about means+/−2.54 micrometers (0.0001 inches).

In various embodiments, a plurality of third translation bearing balls 423 comprising a third diameter may be disposed in a third translation bearing raceway 453. In various embodiments, first diameter may be smaller than second diameter and/or third diameter. In various embodiments, second diameter may be smaller than third diameter.

In various embodiments, first translation bearing raceway 451 may be disposed distal of second translation bearing raceway 452 and/or third translation bearing raceway 453. In various embodiments, first translation bearing raceway 451 may comprise the distal-most translation bearing raceway disposed in the actuator assembly. In various embodiments, first translation bearing raceway 451 may be disposed proximal of second translation bearing raceway 452 and/or third translation bearing raceway 453. In various embodiments, first translation bearing raceway 451 may comprise the proximal-most translation bearing raceway disposed in the actuator assembly.

With continued reference to FIG. 4, in various embodiments, a plurality of first thrust bearing balls 461 comprising a fourth diameter may be disposed in a first thrust bearing raceway 441. In various embodiments, a plurality of second thrust bearing balls 462 comprising a fifth diameter may be disposed in a second thrust bearing raceway 442. In various embodiments, fourth diameter may be smaller than fifth diameter. In various embodiments, fourth diameter may be about 10.16 micrometers smaller than fifth diameter, wherein the term about means+/−2.54 micrometers (0.0001 inches). In various embodiments, fourth diameter may be about 3.1801 millimeters (0.1252 inches) to about 3.1598 millimeters (0.1244 inches), and fifth diameter may be about 3.1902 millimeters (0.1256 inches) to about 3.1699 millimeters (0.1248 inches), wherein the term about means+/−2.54 micrometers (0.0001 inches). In various embodiments, fourth diameter may be about 3.175 millimeters (0.1250 inches) to about 3.165 millimeters (0.1246 inches), and fifth diameter may be about 3.185 millimeters (0.1254 inches) to about 3.175 millimeters (0.1250 inches), wherein the term about means+/−2.54 micrometers (0.0001 inches).

In various embodiments, a plurality of third thrust bearing balls 463 comprising a sixth diameter may be disposed in a third thrust bearing raceway 443. In various embodiments, fourth diameter may be smaller than fifth diameter and/or sixth diameter. In various embodiments, fifth diameter may be smaller than sixth diameter.

In various embodiments, first thrust bearing raceway 441 may be disposed distal of second thrust bearing raceway 442 and/or third thrust bearing raceway 443. In various embodiments, first thrust bearing raceway 441 may comprise the distal-most thrust bearing raceway disposed in the actuator assembly. In various embodiments, first thrust bearing raceway 441 may be disposed proximal of second thrust bearing raceway 442 and/or third thrust bearing raceway 443. In various embodiments, first thrust bearing raceway 441 may comprise the proximal-most thrust bearing raceway disposed in the actuator assembly.

Figure 5A:
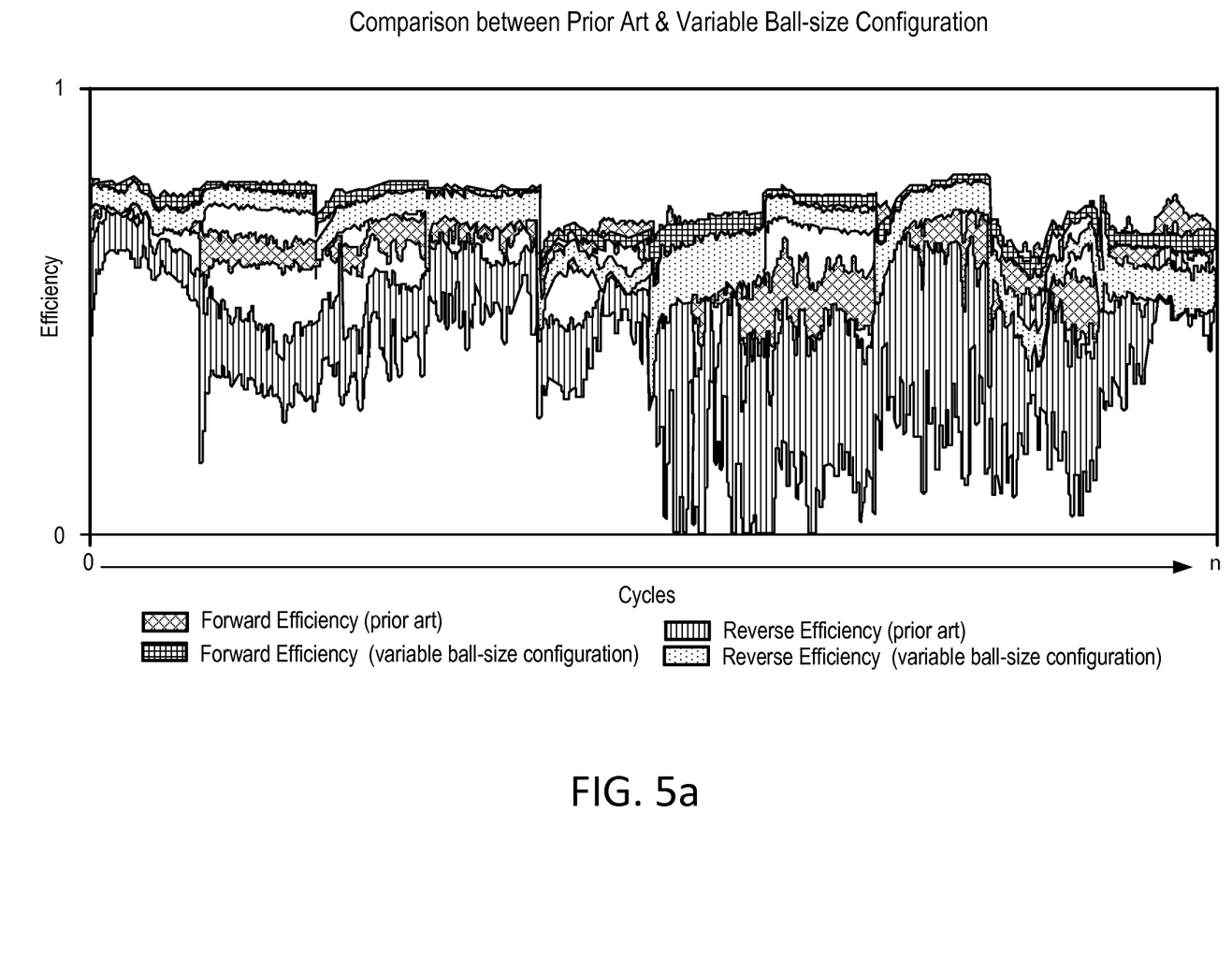
FIG. 5a illustrates test data comparing the performance of a prior art actuator assembly and as actuator assembly comprising a variable ball-size configuration after endurance cycling.
Figure 5B:
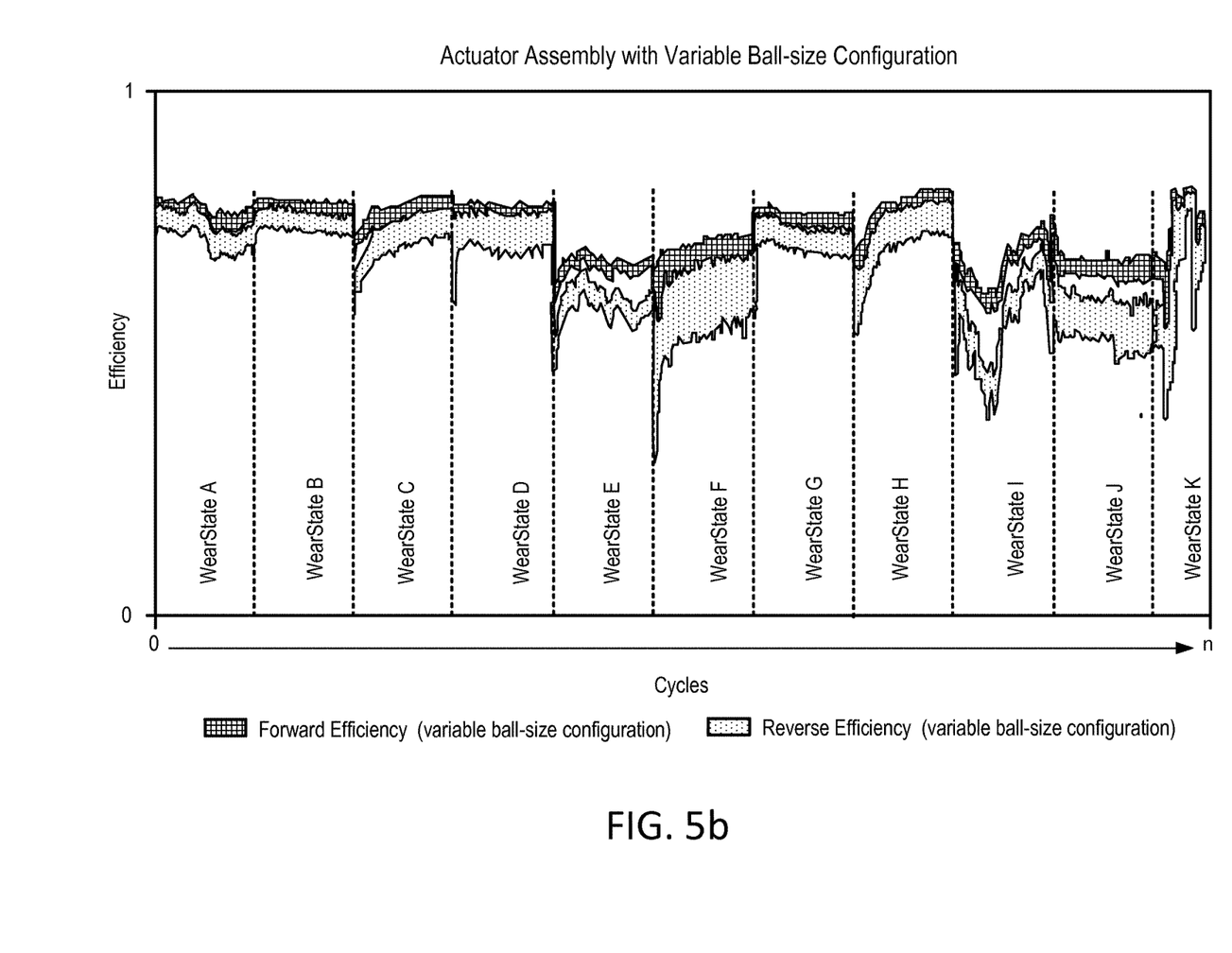
FIG. 5b illustrates test data showing the performance of an actuator assembly comprising a variable ball-size configuration after endurance cycling.
Figure 6A:
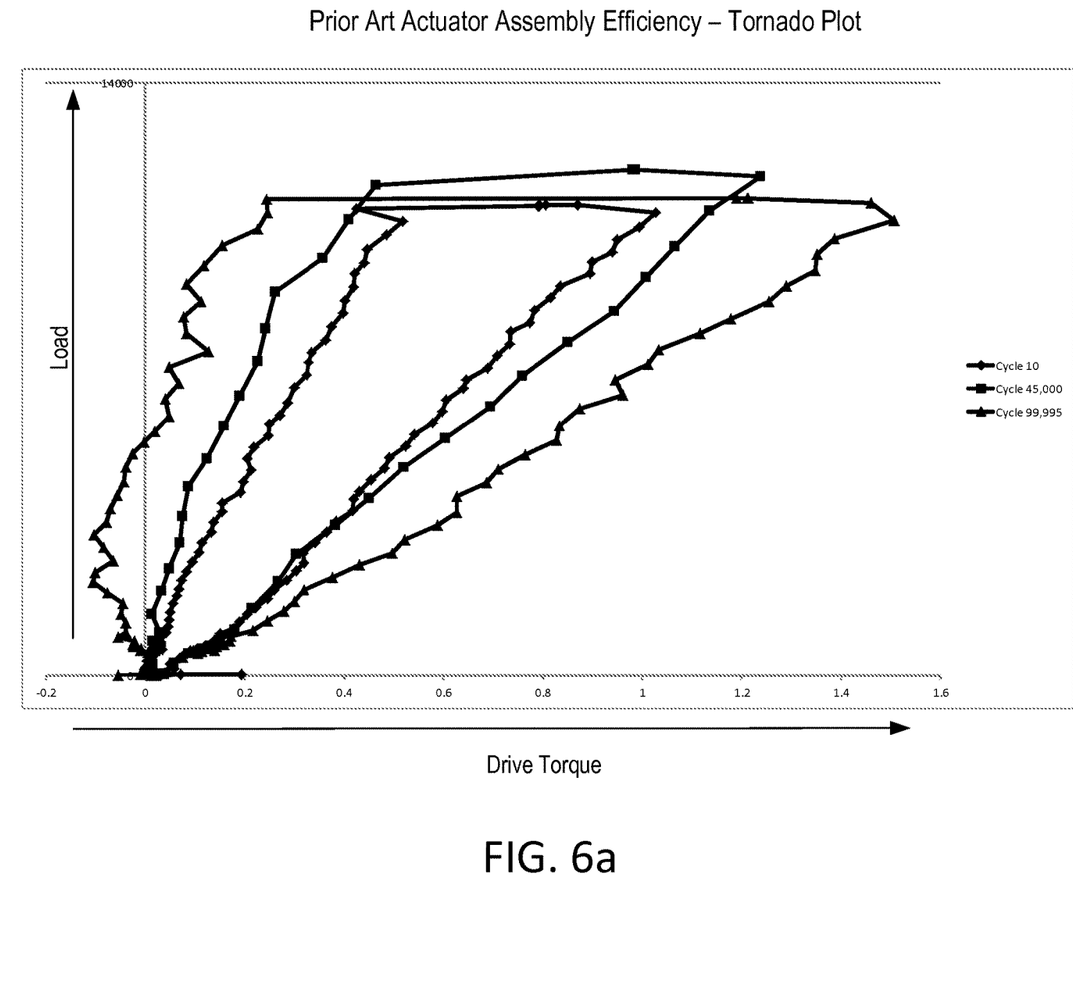
FIG. 6a illustrates test data showing the performance of a prior art actuator assembly after endurance cycling.
Figure 6B:
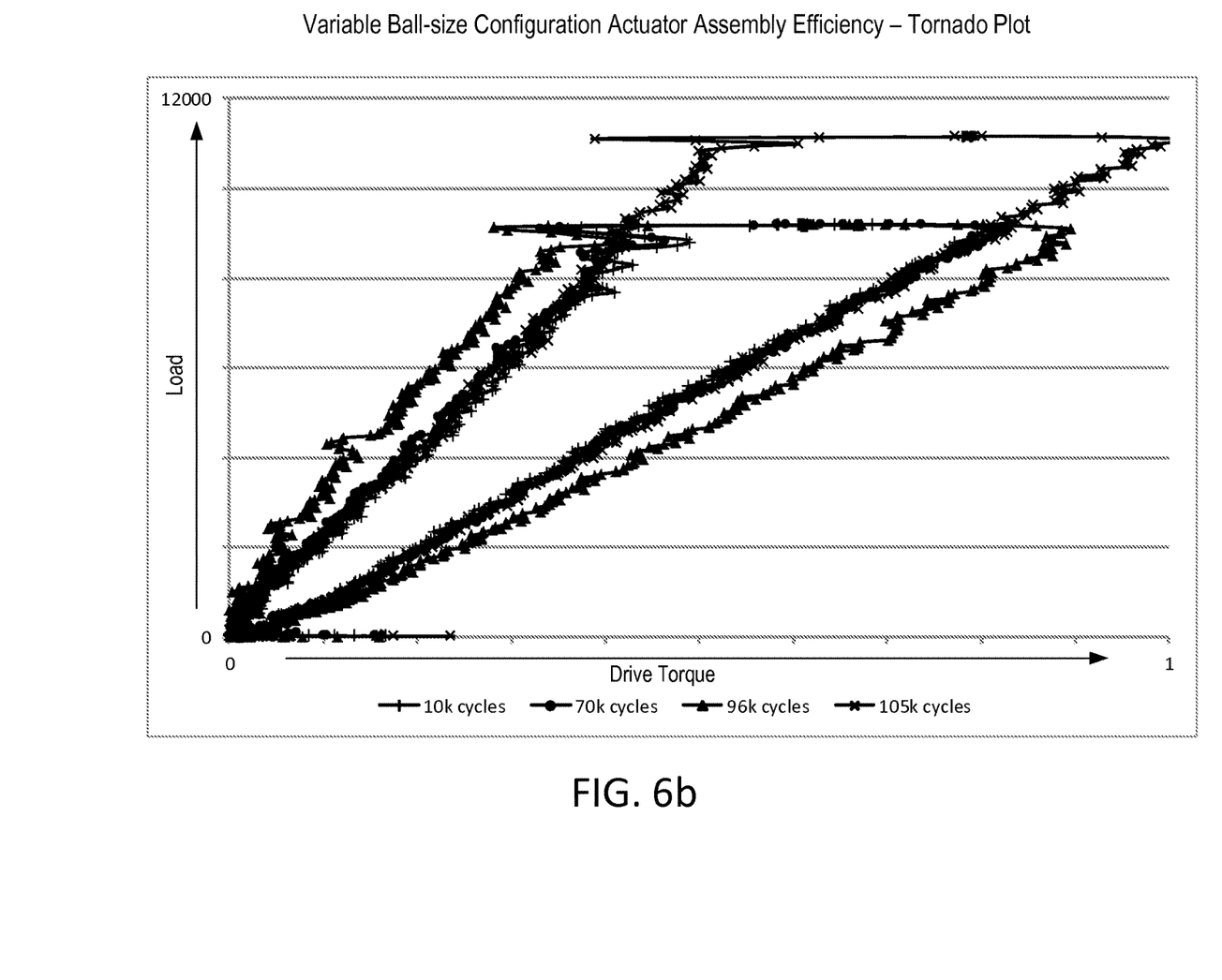
FIG. 6b illustrates test data showing the performance of an actuator assembly comprising a variable ball-size configuration after endurance cycling.

With reference now to FIG. 5*a*, test data comparing the performance of a prior art actuator assembly to an actuator assembly having a variable ball-size configuration is illustrated. The prior art actuator assembly shows a loss of efficiency and consistency over time, with significant loss of performance occurring at about 50,000 cycles. In various embodiments, an actuator assembly having a variable ball-size configuration shows less loss of efficiency and consistency over time than the prior art actuator assembly. With reference now to FIG. 5*b*, test data showing the performance of an actuator assembly having a variable ball-size configuration illustrates consistent efficiency and accuracy occurring up to 10,000 cycles. With reference now to FIG. 6*a*, test data showing the performance of a prior art actuator assembly illustrates that the prior art actuator assembly loses efficiency over time, as demonstrated by an increase in the width of a tornado plot as cycles increase. With reference now to FIG. 6*b*, test data showing the performance of an actuator assembly having a variable ball-size configuration illustrates less decrease in efficiency over time, as demonstrated by narrow tornado plots, as compared to FIG. 6*a*.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An actuator assembly comprising:
    a ballnut comprising a helical track; and
    a ballscrew comprising:
        a first translation bearing track, wherein the helical track and the first translation bearing track form a first translation bearing raceway in which a plurality of first translation bearing balls having a first diameter are disposed; and
        a second translation bearing track, wherein the helical track and the second translation bearing track form a second translation bearing raceway in which a plurality of second translation bearing balls having a second diameter are disposed;
        wherein the first diameter and the second diameter are not equal.

2. The actuator assembly of claim 1, wherein the first translation bearing track comprises a cross-under track.

3. The actuator assembly of claim 1, wherein the ballscrew further comprises:
    a third translation bearing track, wherein the helical track and the third translation bearing track form a third translation bearing raceway in which a plurality of third translation bearing balls having a third diameter are disposed.

4. The actuator assembly of claim 3, wherein the first diameter is smaller than at least one of the second diameter or the third diameter.

5. The actuator assembly of claim 4, wherein the first translation bearing track is proximal to the second translation bearing track and the third translation bearing track.

6. The actuator assembly of claim 4, wherein the first translation bearing track is distal to the second translation bearing track and the third translation bearing track.

7. The actuator assembly of claim 4, wherein the first translation bearing track is medial to the second translation bearing track and the third translation bearing track.

8. The actuator assembly of claim 4, wherein the first diameter is about 10.16 micrometers (0.0004 inches) smaller than at least one of the second diameter or the third diameter.

9. An actuator assembly comprising:
    an actuator drive unit ("ADU") housing comprising a first ADU track, a second ADU track, and a third ADU track; and
    a ballscrew comprising:
        a first thrust bearing track, wherein the first ADU track and the first thrust bearing track form a first thrust bearing raceway in which a plurality of first thrust bearing balls having a first diameter are disposed;
        a second thrust bearing track, wherein the second ADU track and the second thrust bearing track form a second thrust bearing raceway in which a plurality of second thrust bearing balls having a second diameter are disposed; and
        a third thrust bearing track, wherein the third ADU track and the third thrust bearing track form a third thrust bearing raceway in which a plurality of third thrust bearing balls having a third diameter are disposed;
        wherein the first diameter and the second diameter are not equal.

10. The actuator assembly of claim 9, wherein the first diameter is smaller than at least one of the second diameter or the third diameter.

11. The actuator assembly of claim 10, wherein the first thrust bearing track is proximal to the second thrust bearing track and the third thrust bearing track.

12. The actuator assembly of claim 10, wherein the first thrust bearing track is distal to the second thrust bearing track and the third thrust bearing track.

13. The actuator assembly of claim 10, wherein the first thrust bearing track is medial to the second thrust bearing track and the third thrust bearing track.

14. The actuator assembly of claim 9, wherein the first diameter is about 10.16 micrometers (0.0004 inches) smaller than at least one of the second diameter or the third diameter.

15. An aircraft brake actuator comprising:
    a ballnut comprising a helical track; and
    a ballscrew comprising:
        a first translation bearing track, wherein the helical track and the first translation bearing track form a first translation bearing raceway in which a plurality of first translation bearing balls having a first diameter are disposed;
        a second translation bearing track, wherein the helical track and the second translation bearing track form a second translation bearing raceway in which a plurality of second translation bearing balls having a second diameter are disposed; and
        a third translation bearing track, wherein the helical track and the third translation bearing track form a third translation bearing raceway in which a plurality of third translation bearing balls having a third diameter are disposed;

wherein the first diameter is smaller than at least one of the second diameter and the third diameter.

16. The aircraft brake actuator of claim 15, wherein the actuator assembly comprises:

an actuator drive unit ("ADU") housing comprising a first ADU track and a second ADU track; and a ballscrew comprising:
  a first thrust bearing track, wherein the first ADU track and the first thrust bearing track form a first thrust bearing raceway in which a plurality of first thrust bearing balls having a fourth diameter are disposed; and
  a second thrust bearing track, wherein the second ADU track and the second thrust bearing track form a second thrust bearing raceway in which a plurality of second thrust bearing balls having a fifth diameter are disposed;
  wherein the first diameter and the second diameter are not equal.

17. The aircraft brake actuator of claim 16, wherein the ballscrew further comprises:

a third ADU track; and a third thrust bearing track;
  wherein the third ADU track and the third thrust bearing track form a third thrust bearing raceway in which a plurality of third thrust bearing balls having a sixth diameter are disposed; and
  wherein the fourth diameter is smaller than at least one of the fifth diameter or the sixth diameter.

\* \* \* \* \*